United States Patent
Ikeda et al.

(10) Patent No.: US 6,540,385 B2
(45) Date of Patent: Apr. 1, 2003

(54) VEHICULAR HEADLAMP HAVING A LIGHT DISTRIBUTION CHANGING DEVICE

(75) Inventors: Yoshimi Ikeda, Shizuoka (JP); Kazuhiro Hanamori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/994,892

(22) Filed: Nov. 28, 2001

(65) Prior Publication Data

US 2002/0067619 A1 Jun. 6, 2002

(30) Foreign Application Priority Data

Dec. 1, 2000 (JP) .......................................... 2000-367552

(51) Int. Cl.[7] .............................................. F21V 17/02
(52) U.S. Cl. ...................... 362/512; 362/285; 362/286; 362/277; 362/263; 439/546; 439/548
(58) Field of Search ................................. 362/512, 285, 362/286, 277, 263; 439/546, 548, 549, 547

(56) References Cited

U.S. PATENT DOCUMENTS

| | | | |
|---|---|---|---|
| 4,420,799 A | * 12/1983 | Miller | 362/216 |
| 4,595,969 A | * 6/1986 | McNair | 362/217 |
| 5,119,275 A | 6/1992 | Makita | |
| 5,597,232 A | 1/1997 | Ohashi et al. | |
| 5,759,064 A | * 6/1998 | Sugiyama | 439/548 |
| 6,254,436 B1 | 7/2001 | Nitta et al | |
| 6,309,089 B1 | * 10/2001 | Yoneyama et al. | 362/263 |
| 6,322,239 B1 | * 11/2001 | Nitta et al. | 362/543 |

* cited by examiner

Primary Examiner—Sandra O'Shea
Assistant Examiner—Ronald E. DelGizzi
(74) Attorney, Agent, or Firm—Sughrue Mion, PLLC

(57) ABSTRACT

A vehicular headlamp in which a light source and an actuator are connected to a power source using the minimum number of parts, lamp body waterproofing and dustproofing are assured, and each connector is firmly secured to the lamp body of the headlamp. The headlamp includes the actuator for operating a light distribution changing device that changes the distribution of light emitted from the light source. A hookup connector which is provided with a connection portion connected to a power side connector provided on a power cord connected to a vehicle power source at one end thereof and a connection portion connected to the light source side connector and the actuator side connector at the other end thereof is mounted in a hole formed in the lamp body. The hookup connector has a flange which covers the periphery of the opening.

12 Claims, 5 Drawing Sheets

VEHICULAR HEADLAMP HAVING A LIGHT DISTRIBUTION CHANGING DEVICE

BACKGROUND OF THE INVENTION

The present invention relates to a vehicular headlamp having a light distribution changing device that changes the distribution of light emitted from the headlamp by changing the direction of or selectively blocking light emitted from a light source.

A conventional vehicular headlamp includes a discharge bulb 12 forming the light source, a reflector 14 that reflects light emitted from the discharge bulb 12 to the front, a lamp body 16 that houses the reflector 14 and the discharge bulb 12, and a lens 18 that seals the front of the lamp body 16, as shown in the longitudinal sectional view of FIG. 4. Power is supplied to the discharge bulb 12 through a ballast circuit unit (discharge lamp lighting circuit) 20 so as to provide a continuously stabilized discharge current.

In addition, a discharge bulb type vehicular headlamp 10 includes a light distribution changing device for changing the distribution of output light so as to produce a high beam, a low beam, and the like. As the light distribution changing device, for example, a movable shade 24 may be employed, as shown in FIG. 4. In the present embodiment, a support stay 26 of the movable shade 24 is rotatably supported by a pin 30 fixed to a bracket 28 provided at the front surface of the reflector 14, and an output rod 34 of an actuator 32 installed behind the reflector 14 is pivotally attached to the support stay 26. A solenoid or a motor (not shown) is disposed inside the actuator 32. When the solenoid or the motor is operated, the output rod 34 advances or retreats accordingly. When the movable shade 24 is located at the position shown in FIG. 4, a low beam light distribution is obtained, and when the actuator 32 is operated to tilt the movable shade 24 forward, a high beam light distribution is obtained.

In the vehicular headlamp 10 including such a light distribution changing device, power is supplied to the discharge bulb 12 and the actuator 32 from a vehicle power source (not shown) through a power cord 40, two hookup cords 36A, 36B, a light source cord 38A, and an actuator cord 38B.

One end of the power cord 40 is connected to the vehicle power source, while the other end thereof is provided with a power connector 42. One end of each of the two hookup cords 36A, 36B is connected to a power receiving connector 44, which in turn is connected to the power connector 42. Power feeding connectors 46A, 46B are connected to the respective other ends of the two hookup cords 36A, 36B. One end of the light source cord 38A is provided with a light source side connector 48A connected to the power feeding connector 46A, and a socket 50 in which the discharge bulb 12 is mounted is connected to the other end thereof. The ballast circuit unit 20 is mounted on the lower inner surface of the lamp body 16 approximately in the middle thereof. One end of the actuator cord 38B is provided with an actuator side connector 48B connected to the power feeding connector 48B, and the actuator 32 is connected to the other end thereof. The connection of these connectors can be easily disconnected, such as when repairs or the like are required.

An opening is provided in the lamp body 16 and a bushing 56 is engaged with the opening. The hookup cords 36A, 36B pass through a through hole in the bushing 54. The bushing 56 provides waterproofing and dustproofing functions, in addition to preventing the hookup cords 36A, 36B from being worn as a result of a direct contact with the opening. The power receiving connector 44 of the hookup cords 36A, 36B is connected to the power connector 42 outside the lamp body 16, and each of the power feeding connectors 48A, 48B of the hookup cords 36A, 36B is connected to the light source side connector 48A and the actuator side connector 48B inside the lamp body 16. These connectors 42, 44, 46A, 46B, 48A, and 48B are firmly secured to the lamp body 16 or other desired component by fixtures (not shown) to prevent them from being disconnected due to vehicle vibration or the like.

However, in the conventional discharge bulb type vehicular headlamp 10, a relatively large number of parts, including the hookup cables 36A, 36B, the bushing 56, and the fixture for each connector is required between the power side connector 42, the light source side connector 48A, and the actuator side connector 48B, as described above. This presents problems in that the associated manufacturing requires much time and labor and the total cost is rather high.

SUMMARY OF THE INVENTION

To solve these problems, the present invention provides a vehicular headlamp in which a power connector is connected to a light source side connector and to an actuator side connector using the minimum number of parts, the lamp body can be made waterproof and dustproof, and each connector can be firmly secured to the lamp body.

More specifically, a vehicular headlamp according to the invention includes a light source, a reflector, a light distribution changing device that selectively changes the distribution of light by either changing the direction of or blocking the light emitted from the light source, an actuator that operates the light distribution changing device, a light source cord which is provided with a light source side connector at one end thereof and which is connected to the light source at the other end thereof, an actuator cord which is provided with an actuator side connector at one end thereof and which is connected to the actuator at the other end thereof are provided in a lamp body, and a hookup connector which is provided with a connection portion connected to a power connector provided in a power cord connected to a vehicle power source at one end thereof and a connection portion connected to the light source side connector and the actuator side connector at the other end thereof, wherein the hookup connector is connected to an opening provided in the lamp body with the other end thereof located inside the lamp body. With this arrangement, it is possible to make the lamp body waterproof and dustproof while reducing the number of parts, and to firmly secure each connector to the lamp body.

The light source may be a discharge bulb, and the light source cord may be provided with a ballast circuit unit in the central portion thereof. The use of a high efficiency discharge bulb can reduce power consumption.

The hookup connector can be connected to the opening by inserting the other end of the hookup connector in the opening and turning it. For this purpose, a flange is provided at a central portion of the hookup connector, and the flange covers a periphery of the opening when the hookup connector is connected to the opening. Accordingly, the hookup connector can be removably connected to the opening easily, and the lamp body can be made waterproof even more reliably.

The actuator may be installed at the lower side on the rear surface of a reflector, and the ballast circuit unit installed on the bottom portion of the lamp body. In this case the actuator and the ballast circuit unit are located close to each other, and accordingly a cord through which power is fed from the hookup connector to both parts can be made as short as possible.

The invention further provides a vehicular headlamp including a lamp body, a light source and a reflector mounted in the lamp body for emitting a light beam from the headlamp, means for changing the light distribution of the light beam and which is mounted in the lamp body, means for actuating the light distribution changing means, a single hookup connector mounted in an opening in the lamp body, first connection means for making electrical connections between the hookup connector and the light source and the light distribution changing means, and second connection means for making electrical connections between the hookup connector and the actuating means.

The light distribution means may be mounted on the lower front surface of the reflector, and the actuating means mounted on the rear surface of the reflector.

The light source may be a discharge bulb, in which case a ballast circuit unit is mounted on the inner lower surface of the lamp body.

The hookup connector preferably has a portion on the outer periphery thereof formed as a bayonet-type connection member for mounting the hookup connector in the aforementioned opening in the lamp body. The bayonet-type connection member includes a flange which covers the periphery of the opening when the hookup connector is connected to the opening. A packing maybe interposed between the flange and the opposed surface of the lamp body around the periphery of the opening.

DESCRIPTION OF THE PREFERRED EMBODIMENTS

A preferred embodiment of a vehicular headlamp according to the present invention will be described with reference to FIGS. 1–3 and 5.

Figure 1:
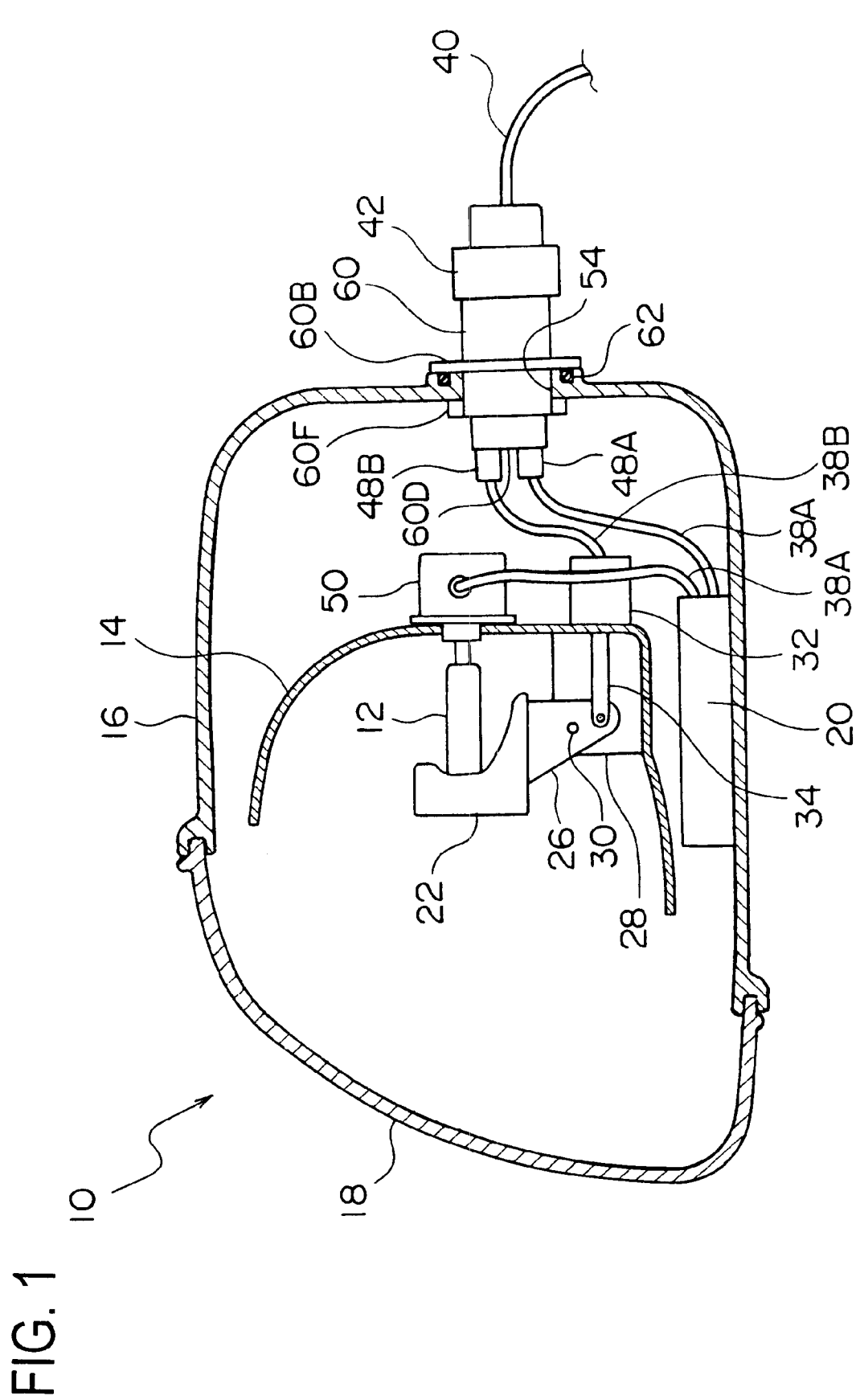
FIG. 1 is a longitudinal sectional view showing a vehicular headlamp constructed according to preferred embodiment of the present invention.
Figure 3:
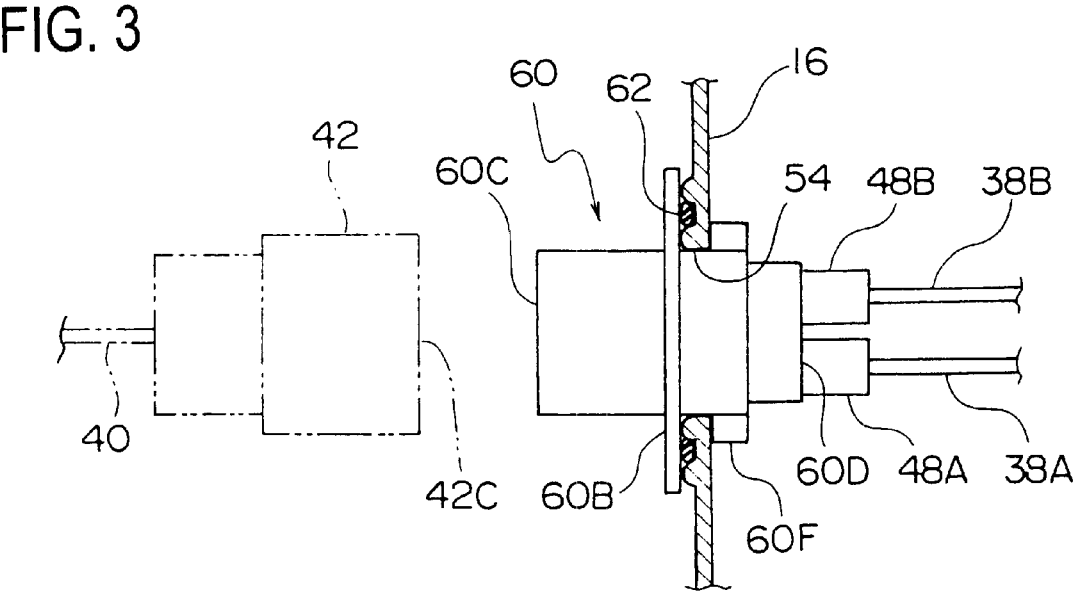
FIG. 3 is an enlarged sectional view showing a connection portion between a hookup connector and a lamp body in the vehicular headlamp of FIG. 1.
Figure 4:
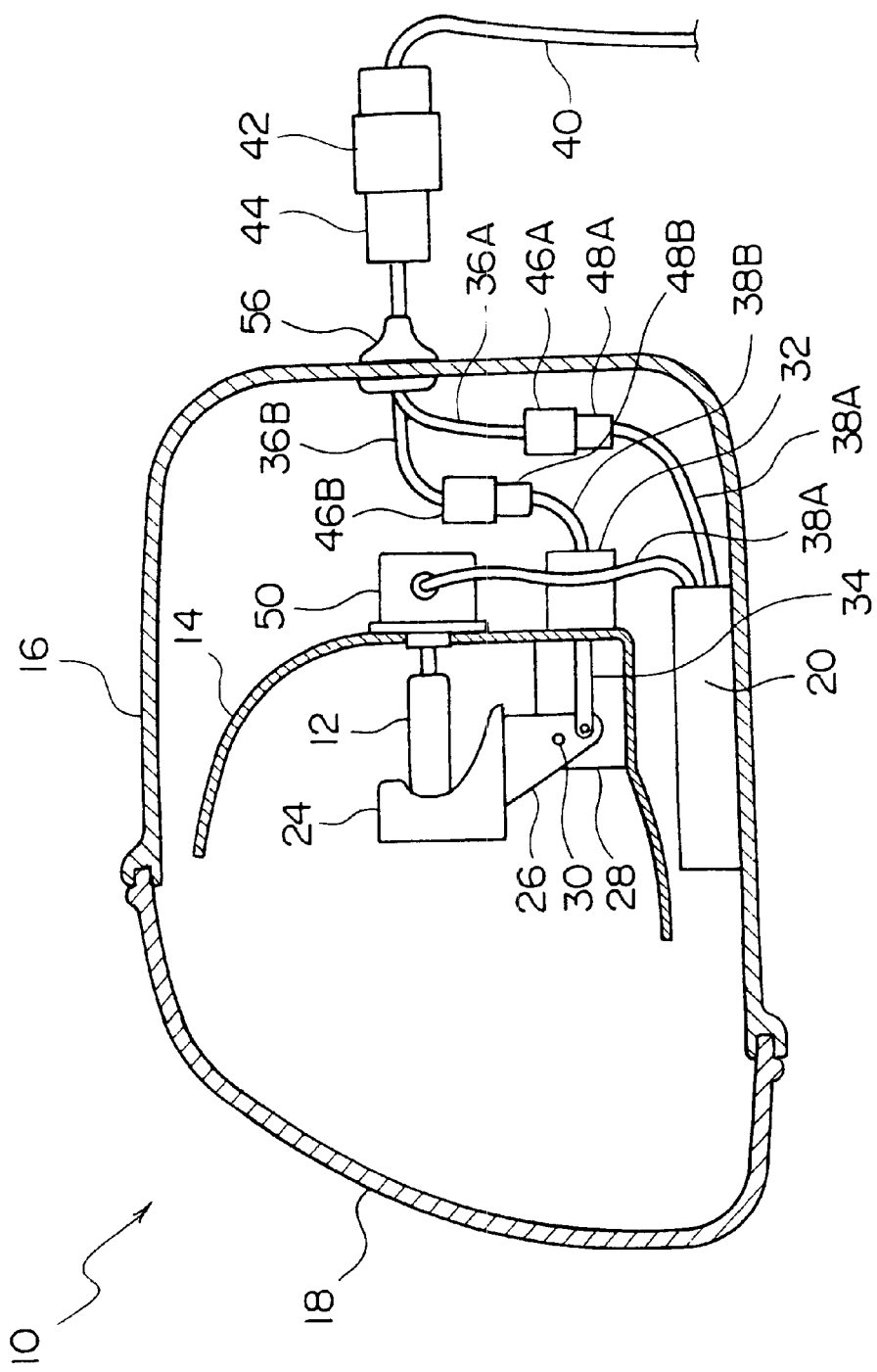
FIG. 4 is a longitudinal sectional view showing a conventional vehicular headlamp.

As is apparent from the longitudinal sectional view shown in FIG. 1, the vehicular headlamp of the present embodiment has the same construction as the conventional headlamp shown in FIG. 4, except that a hookup connector 60 is used to connect the power connector 42 to the light source side connector 48A and to the actuator side connector 48B. As such, in FIGS. 1–3 and 5, elements which are the same as those in the conventional headlamp are indicated by the same reference numerals as in FIG. 4 and a further description thereof will be omitted.

Figure 2:
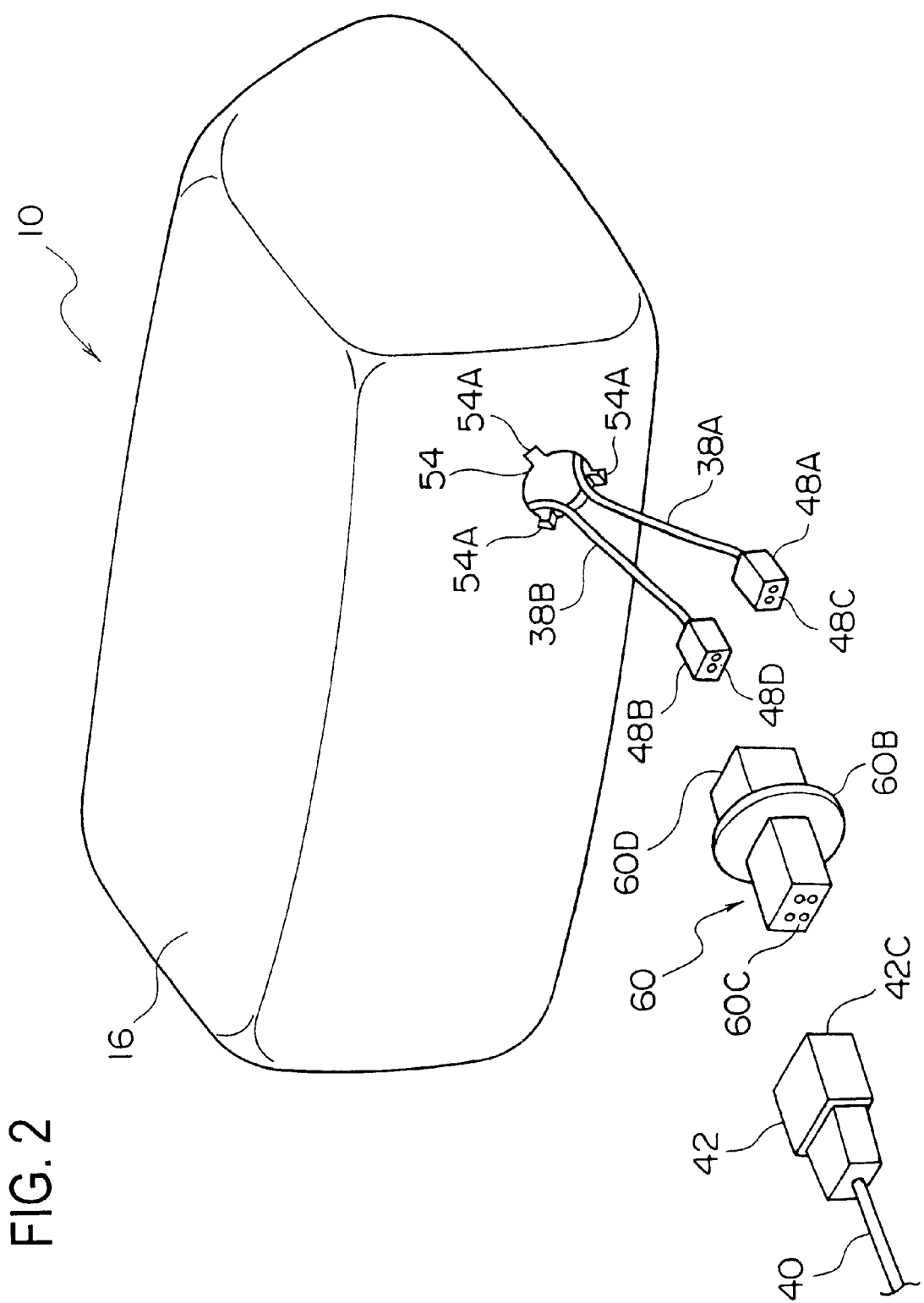
FIG. 2 is a rear perspective view showing the vehicular headlamp of FIG. 1.

Referring now to the rear perspective view shown in FIG. 2 and the enlarged sectional view showing a connection portion between the hookup connector 60 and the lamp body 16 shown in FIG. 3, the hookup connector 60 will be described in detail.

Figure 5:
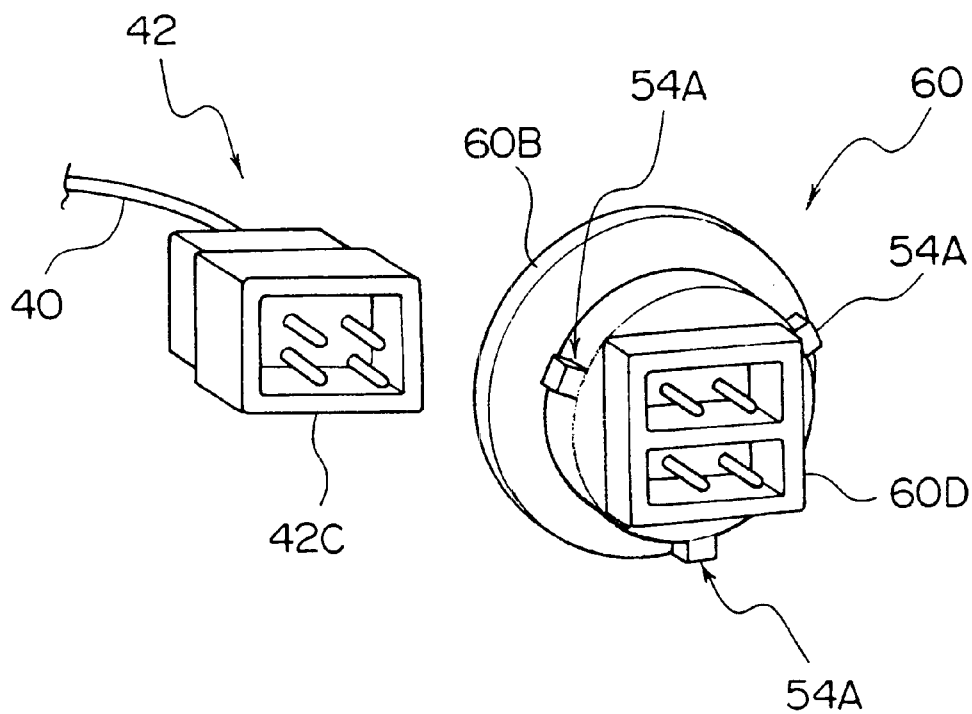
FIG. 5 is a view showing the inside of a female connection portion of a power connector and the inside of a female connection portion of the hookup connector in the vehicular headlamp of FIG. 1.

One end of the hookup connector 60 is provided with a male connection portion 60C, which is connected to a female connection portion 42C of the power connector 42. The other end of the hookup connector 60 is provided with a female connector portion 60D, which is connected to respective male connection portions 48C, 48D of the light source side connector 48A and the actuator side connector 48B. FIG. 5 shows in detail the interior of the female connection portion 42C of the power connector 42 and of the female connection portion 60D of the hookup connector 60. Since these connection portions have the same construction as the connection portions of the conventional connectors, a further detailed description thereof will be omitted. It goes without saying that the male and female connection portions can be reversed.

A flange 60B is provided at a central portion in a longitudinal direction of the hookup connector 60. An opening 54 is provided in the lamp body 16. Protrusions 60F on the connection portion 60D side of the hookup connector 60 are aligned with cutout portions 54A in the periphery of the opening 54. The connection portion 60D side of the hookup connector 60 is inserted into the opening 54. The hookup connector 60 can easily be removably connected to the opening 54 by turning the hookup connector 60 with the flange 60B in contact with the periphery of the opening 54 in the manner of a well-known bayonet connection. The location of the opening 54 is not limited to the rear surface of the lamp body 16, but may be a side face, top face, or bottom face of the lamp body 16, depending on the desired arrangement of other parts.

When the hookup connector 60 is connected to the opening 54, the flange 60B comes into contact with the periphery of the opening 54, which makes the lamp body 16 waterproof and dustproof. To make the lamp body 16 waterproof and dustproof even more reliably, a packing 62 may be interposed between the flange 60B and the periphery of the opening 54.

The ballast circuit unit 20 is installed in the bottom portion of the lamp body 16, and the actuator 32 is installed at the lower side on the YY rear surface of a reflector. Thus, the two parts are located close to each other, and accordingly the cords 38A, 38B through which power is fed from the hookup connector 60 to the both parts can be made as short as possible.

The invention is of course not limited to the embodiment described above. For example, an ordinary incandescent electric bulb may be used as the light source instead of the discharge bulb 12. Depending on the position of the power side connector 42, an extension cord may be connected to one end of the hookup connector 60, and the connection portion 60C which is connected to the power side connector 42 may be provided at a leading end of the extension cord. In addition, the hookup connector 60 may be integrated with the lamp body 16, and various other design changes are possible.

As is evident from the above description, in the vehicular headlamp according to the invention, the hookup connector is used to connect the power connector to the light source side connector and to the actuator side connector, and the hookup connector is connected to the opening provided in the lamp body. With this arrangement it is possible to make the lamp body waterproof and dustproof while reducing the number of parts, and to firmly secure each connector to the lamp body. As a result, a high quality vehicular headlamp can be easily manufactured at low cost. The use of a high efficiency discharge bulb can reduce power consumption.

Moreover, with the invention the hookup connector can be removably connected to the opening easily, and the lamp body can be made waterproof and dustproof even more reliably.

Furthermore, by installing the ballast circuit unit at the bottom portion of the lamp body and the actuator at the lower side on the rear surface of the reflector so that the two parts are located close to each other, the cords through which power is fed from the hookup connector to the two parts can be made as short as possible.

It should further be apparent to those skilled in the art that various changes as to the form and detail of the invention as shown and described above may be made. It is intended that such changes be included within the spirit and scope of the claims appended hereto.

What is claimed is:

1. A vehicular headlamp comprising: a lamp body; a light source mounted in said lamp body; a reflector mounted in said lamp body for reflecting light from said light source; a light distribution changing device that changes the distribution of light emitted by the headlamp by at least one of changing a direction of and selectively blocking portions of light emitted from said light source; an actuator that operates said light distribution changing device; a light source cord having one end connected to said light source and provided with a light source side connector at the other end thereof; an actuator cord connected to said actuator at one end thereof and provided with an actuator side connector at the other end thereof; and a hookup connector provided at one end thereof with a first connection portion for making connection to a power connector of a power cord connected to a vehicle power source and at the other end thereof with a second connection portion connected to said light source side connector and said actuator side connector, said hookup connector being mounted in an opening in said lamp body with said first connection portion being located outside said lamp body and said second connection portion being located inside said lamp body,
wherein the light distribution changing device comprises a movable shade.

2. The vehicular headlamp according to claim 1, wherein said light source comprises a discharge bulb, and further comprising a ballast circuit unit provided in a middle portion of said light source cord.

3. The vehicular headlamp according to claim 1, wherein said hookup connector comprises a portion on the outer periphery thereof formed as a bayonet-type connection member for mounting said hookup connector in said opening.

4. The vehicular headlamp according to claim 1, wherein said hookup connector is attachable to said opening by inserting said other end of said hookup connector into said opening and turning said hookup connector, a flange is provided at a central portion of said hookup connector, and said flange covers a periphery of said opening when said hookup connector is attached to said opening.

5. The vehicular headlamp according to claim 4, further comprising a packing inserted between said flange and an opposed surface portion of said lamp body around a peripheral portion of said opening.

6. The vehicular headlamp according to claim 1, wherein said actuator is installed at a lower side on a rear surface of said reflector, and said ballast circuit unit is installed at a bottom portion of said lamp body.

7. The vehicular headlamp according to claim 6, wherein said light distribution changing device comprises a bracket fixed to a lower front surface of said reflector, a support stay pivotally mounted on said bracket, and a movable shade extending from said support stay, and wherein said actuator comprises an output rod coupled to said movable support stay.

8. A vehicular headlamp comprising: a lamp body; a light source and a reflector mounted in said lamp body for emitting a light beam from said headlamp; means for changing a light distribution of said light beam mounted in said lamp body; means for actuating said light distribution changing means; a single hookup connector mounted in an opening in said lamp body; first connection means for making electrical connections between said hookup connector and said light source and said light distribution changing means; and second connection means for making electrical connections between said hookup connector and said actuating means,
wherein the light distribution changing means comprises a movable shade.

9. The vehicular headlamp according to claim 8, wherein said light distribution means is mounted on a lower front surface of said reflector and said actuating means is mounted on a rear surface of said reflector.

10. The vehicular headlamp according to claim 9, wherein said light source comprises a discharge bulb, and further comprising a ballast circuit unit mounted on an inner lower surface of said lamp body.

11. The vehicular headlamp according to claim 8, wherein said hookup connector comprises a portion on the outer periphery thereof formed as a bayonet-type connection member for mounting said hookup connector in said opening in said lamp body.

12. The vehicular headlamp according to claim 11, wherein said bayonet-type connection member comprises a flange provided at a central portion of said hookup connector, said flange covering a periphery of said opening when said hookup connector is attached to said opening, and further comprising a packing inserted between said flange and an opposed surface portion of said lamp body around a peripheral portion of said opening.

* * * * *